US009911539B2

(12) United States Patent
Ren et al.

(10) Patent No.: US 9,911,539 B2
(45) Date of Patent: Mar. 6, 2018

(54) INTEGRATED PHOTOVOLTAIC-BATTERY DEVICE AND RELATED METHODS

(71) Applicant: University of Kansas, Lawrence, KS (US)

(72) Inventors: Shenqiang Ren, Lawrence, KS (US); Maogang Gong, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 297 days.

(21) Appl. No.: 14/654,884

(22) PCT Filed: Dec. 20, 2013

(86) PCT No.: PCT/US2013/076982
§ 371 (c)(1),
(2) Date: Jun. 23, 2015

(87) PCT Pub. No.: WO2014/105710
PCT Pub. Date: Jul. 3, 2014

(65) Prior Publication Data
US 2015/0340166 A1    Nov. 26, 2015

Related U.S. Application Data

(60) Provisional application No. 61/848,118, filed on Dec. 24, 2012.

(51) Int. Cl.
*H01L 31/04*  (2014.01)
*H01G 9/20*   (2006.01)

(52) U.S. Cl.
CPC .......... *H01G 9/2013* (2013.01); *H01G 9/20* (2013.01)

(58) Field of Classification Search
CPC ................................ H01G 9/2013; H01G 9/20
USPC .......................................................... 257/84
See application file for complete search history.

(56) References Cited

U.S. PATENT DOCUMENTS

| 2007/0012355 A1 | 1/2007 | LoCascio et al. |
| 2009/0087939 A1 | 4/2009 | Lee |
| 2010/0276731 A1 | 11/2010 | Nam et al. |
| 2011/0240108 A1 | 10/2011 | Law et al. |

(Continued)

FOREIGN PATENT DOCUMENTS

JP    2001217435    8/2001

OTHER PUBLICATIONS

Gong et al., Symmetry-Defying Iron Pyrite ($FeS_2$) Nanocrystals through Oriented Attachment, Scientific Reports 3: 2092, Jun. 28, 2013, pp. 1-6.

(Continued)

*Primary Examiner* — Jayne Mershon
(74) *Attorney, Agent, or Firm* — Bell & Manning, LLC

(57) ABSTRACT

Provided are $FeS_2$ based photovoltaic battery devices comprising a transparent substrate, an active layer disposed over the transparent substrate, the active layer comprising a porous film of $FeS_2$ nanocrystals and a halide ionic liquid infiltrating the porous film, and an electrode disposed over the active layer. The device may be configured such that under exposure to light, photons incident on the active layer are absorbed by the $FeS_2$ nanocrystals, generating a current and a voltage, whereby a separation of charge within the active layer is created, which is discharged in the absence of the light.

15 Claims, 13 Drawing Sheets

(56) References Cited

U.S. PATENT DOCUMENTS

| | | | |
|---|---|---|---|
| 2012/0097238 A1* | 4/2012 | Isaacs-Sodeye | B82Y 30/00 |
| | | | 136/256 |
| 2012/0118368 A1 | 5/2012 | Huang et al. | |
| 2012/0208316 A1 | 8/2012 | Su et al. | |
| 2013/0048062 A1 | 2/2013 | Min et al. | |
| 2013/0119346 A1 | 5/2013 | Huang et al. | |
| 2013/0168228 A1* | 7/2013 | Ozin | B01J 35/004 |
| | | | 204/157.9 |
| 2013/0263918 A1 | 10/2013 | Konstantatos et al. | |

OTHER PUBLICATIONS

Gong et al., Iron Pyrite ($FeS_2$) Broad Spectral and Magnetically Responsive Photodetectors, Adv. Optical Mater. 1, Jan. 31, 2013, pp. 78-83.

Tang et al., Colloidal-quantum-dot photovoltaics using atomic-ligand passivation, Nature Materials, vol. 10, Sep. 18, 2011, pp. 765-771.

This New Solar Cell Doesn't Need a Battery, http://www.arizonaenergy.org/News_06/News_July06, Jul. 1, 2006, pp. 1-2.

International Search Report and Written Opinion mailed in PCT/US2013/076982, dated Apr. 29, 2014.

Kirkeminde et al., All inorganic iron pyrite nano-heterojunction solar cells, Nanoscale 4, Sep. 13, 2012, pp. 7649-7654.

Gong et al., Ionic-passivated $FeS_2$ photocapicitors for energy conversion and storage, Chem. Commun. 49, Aug. 8, 2013, pp. 9260-9262.

* cited by examiner

INTEGRATED PHOTOVOLTAIC-BATTERY DEVICE AND RELATED METHODS

CROSS-REFERENCE TO RELATED APPLICATIONS

This application is a National Stage of International Application No. PCT/US2013/076982 that was filed on Dec. 20, 2013, which claims the benefit of U.S. Provisional Patent Application No. 61/848,118 that was filed on Dec. 24, 2012, the entire contents of which are hereby incorporated by reference.

REFERENCE TO GOVERNMENT RIGHTS

This invention was made with government support under grant number CMMI-1332658 awarded by the National Science Foundation. The government has certain rights in the invention.

BACKGROUND

Earth abundant iron pyrite ($FeS_2$) nanostructured materials have been proposed in renewable energy applications, such as photovoltaics (PVs), energy storage batteries and photocatalysts. (See Ennaoui, A.; Tributsch, H., Iron sulfide solar-cells. *Solar Cells* 1984, 13 (2), 197-200; Choi, J.-W.; Cheruvally, G.; Ahn, H.-J.; Kim, K.-W.; Ahn, J.-H., Electrochemical characteristics of room temperature $Li/FeS_2$ batteries with natural pyrite cathode. *Journal of Power Sources* 2006, 163 (1), 158-165; Kirkeminde, A.; Ren, S., Thermodynamic control of iron pyrite nanocrystal synthesis with high photoactivity and stability. *Journal of Materials Chemistry A* 2013, 1 (1), 49-54; Puthussery, J.; Seefeld, S.; Berry, N.; Gibbs, M.; Law, M., Colloidal iron pyrite ($FeS_2$) nanocrystal inks for thin-film photovoltaics. *Journal of the American Chemical Society* 2011, 133 (4), 716-9.) In addition, due to its high theoretical capacity (890 mAh/g) and low environmental impact, $FeS_2$ is an attractive cathode material in Lithium Ion Batteries (LIB). (See Shao-Horn, Y.; Osmialowski, S.; Horn, Q. C., Nano-$FeS_2$ for Commercial $Li/FeS_2$ Primary Batteries. *Journal of The Electrochemical Society* 2002, 149 (11), A1499.) Regarding photovoltaic applications, iron pyrite is attractive due to its high photoabsorption coefficient (above $10^5$ cm$^{-1}$) and ideal light harvesting bandgap (0.95 eV). (See Puthussery, J.; Seefeld, S.; Berry, N.; Gibbs, M.; Law, M., Colloidal iron pyrite ($FeS_2$) nanocrystal inks for thin-film photovoltaics. *Journal of the American Chemical Society* 2011, 133 (4), 716-9.) However, the efficiency of $FeS_2$ PV devices has been extremely modest. (See Steinhagen, C.; Harvey, T. B.; Stolle, C. J.; Harris, J.; Korgel, B. A., Pyrite Nanocrystal Solar Cells: Promising, or Fool's Gold? *The Journal of Physical Chemistry Letters* 2012, 3 (17), 2352-2356.) In particular, $FeS_2$ is a semiconductor with low conductivity and high surface trap states. (See Birkholz, M.; Fiechter, S.; Hartmann, A.; Tributsch, H., Sulfur deficiency in iron pyrite ($FeS_{2-x}$) and its consequences for band-structure models. *Physical Review B* 1991, 43 (14), 11926-11936.) In addition, synthesized colloidal $FeS_2$ nanostructures are typically surrounded with a layer of long chain organic ligands (e.g., octadecylamine (ODA), oleic acid), which are usually one to several nanometers in length. (See Puthussery, J.; Seefeld, S.; Berry, N.; Gibbs, M.; Law, M., Colloidal iron pyrite ($FeS_2$) nanocrystal inks for thin-film photovoltaics. *Journal of the American Chemical Society* 2011, 133 (4), 716-9; Gong, M. G.; Kirkeminde, A.; Ren, S. Q., Iron Pyrite ($FeS_2$) Broad Spectral and Magnetically Responsive Photodetectors. DOI: 10.1002/adom.201200003, Advanced Optical Materials, 2012; Yuan, B.; Luan, W.; Tu, S. T., One-step synthesis of cubic $FeS_2$ and flower-like $FeSe_2$ particles by a solvothermal reduction process. *Dalton transactions* 2012, 41 (3), 772-6.) These organic ligands may be exchanged for shorter molecules such as ethanedithiol (EDT), resulting in a chain of about ~0.5 nm in length. Each of these organic ligands may contribute to poor charge transfer and transport, electronic coupling and electrical contact during operation of the devices. Another reason for the limited conversion efficiency is the degradation of $FeS_2$. For example, Tributsch et al. reported 2.8% efficiency for a $FeS_2$ single crystal-aqueous photoelectrochemical cell. (See Ennaoui, A.; Fiechter, S.; Smestad, G.; Tributsch, H. In *Preparation of iron disulfide and its use for solar energy conversion*, First World Renewable Energy Congress, 1990: 1990; pp 458-464; Altermatt, P. P.; Kiesewetter, T.; Ellmer, K.; Tributsch, H., Specifying targets of future research in photovoltaic devices containing pyrite ($FeS_2$) by numerical modelling. *Solar Energy Materials & Solar cells* 2002, 71, 181-195.) One of the main challenges in this device was the degradation of $FeS_2$ in iodide/triiodide aqueous electrolyte. Furthermore, the instability of $FeS_2$ is also related to the presence of surface states on $FeS_2$ which can trap the photoexcited electrons. Ultimately, whether $FeS_2$ is to be utilized in an energy harvesting or an energy storage device, the deficiencies of $FeS_2$ have to be addressed and the devices are typically independently developed and optimized, due to the challenges in integrating these two functions.

SUMMARY

Provided herein are $FeS_2$-based photovoltaic battery (PVB) devices and related methods.

In one aspect, photovoltaic battery devices are provided which comprise a transparent substrate; an active layer disposed over the transparent substrate, the active layer comprising a porous film of $FeS_2$ nanocrystals and a halide ionic liquid infiltrating the porous film; and an electrode disposed over the active layer, wherein the device is configured such that under exposure to sunlight, photons incident on the active layer are absorbed by the $FeS_2$ nanocrystals, generating a current and a voltage, whereby a separation of charge within the active layer is created, which is discharged in the absence of the sunlight.

In another aspect, a methods of using a photovoltaic battery devices are provided which comprise exposing the devices to sunlight, the devices comprising a transparent substrate; an active layer disposed over the transparent substrate, the active layer comprising a porous film of $FeS_2$ nanocrystals and a halide ionic liquid infiltrating the porous film; and an electrode disposed over the active layer, wherein photons incident on the active layer are absorbed by the $FeS_2$ nanocrystals, generating a current and a voltage, whereby a separation of charge within the active layer is created, which is discharged in the absence of the sunlight.

Also provide are methods of making photovoltaic battery devices.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

DETAILED DESCRIPTION

Figure 1:
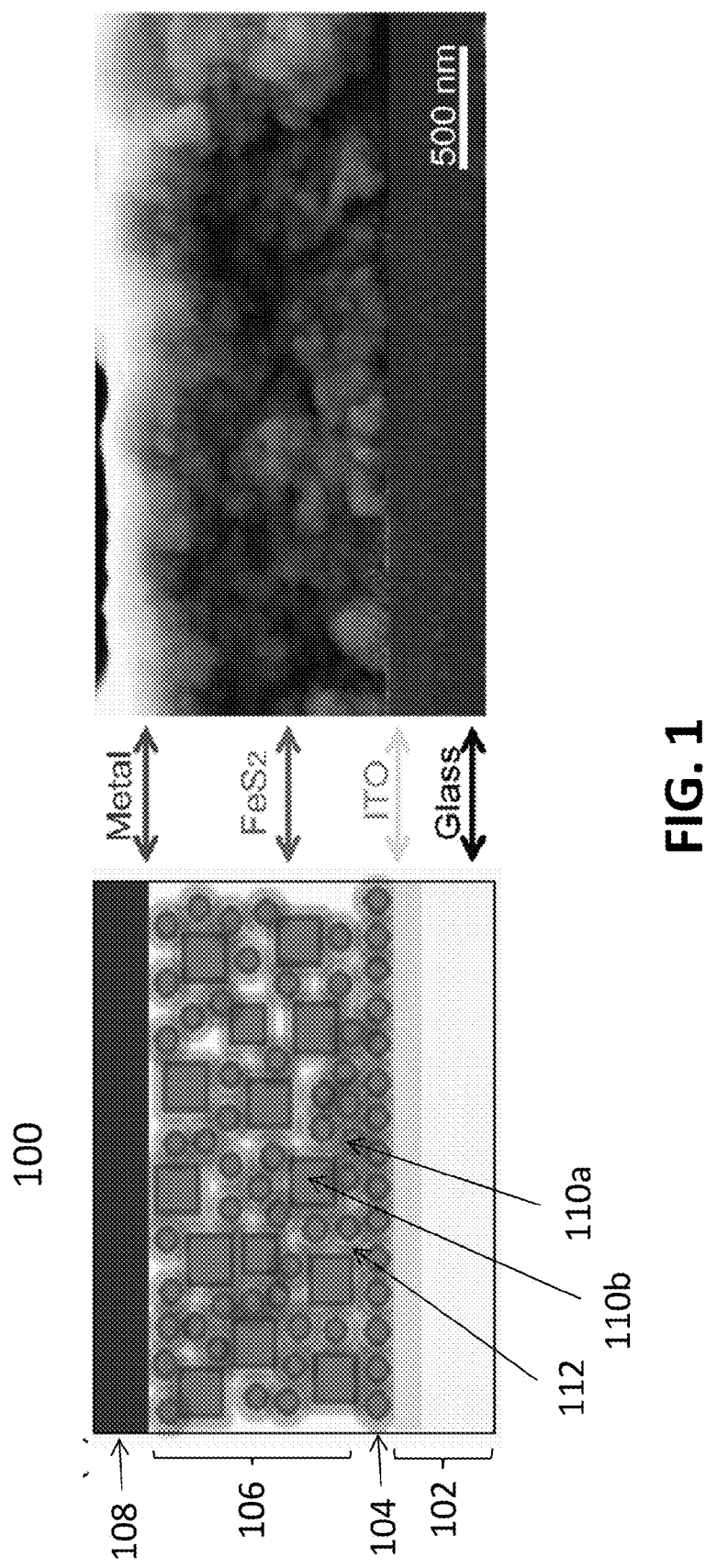
FIG. 1 shows a cross-section of a schematic of a photovoltaic battery (PVB) device and a cross-section of a scanning electron microscope image of a corresponding PVB device.

Provided herein are $FeS_2$-based photovoltaic battery (PVB) devices and related methods.

The PVB devices are capable of achieving photoelectron conversion and energy storage simultaneously under illumination (e.g., sunlight). In the dark, the PVB devices are capable of discharging the stored electrical energy. The integration of these functions in a single device using a single active layer comprising $FeS_2$ nanocrystals reduces the complexity, size and cost compared to convention energy harvesting and storage solutions. In addition, a solution-based, room temperature method for making the PVB devices is disclosed, which is amenable to low cost, roll-by-roll production of $FeS_2$-based PVB devices on flexible substrates. The PVB devices will find use in any application in which it is desirable to have a non-interruptive source of power, including in solar aircraft, solar vehicle and household electrical applications.

The PVB devices comprise a transparent substrate, an active layer disposed over the transparent substrate and an electrode disposed over the active layer. The active layer comprises a porous film of $FeS_2$ nanocrystals and a halide ionic liquid infiltrating the porous film.

As further described below, the PVB devices may be configured such that under exposure to light (e.g., sunlight), photons incident on the active layer are absorbed by the $FeS_2$ nanocrystals, generating a current and a voltage, whereby a separation of charge within the active layer is created, which is discharged in the absence of the light. More specifically, in the absence of light, the halide ionic liquid does not experience much charge separation in the active layer, limited mostly to halide anions being adsorbed onto the $Fe^{2+}$-rich defect sites of the $FeS_2$ nanocrystals. Under exposure to light, the p-type $FeS_2$ nanocrystals are photoexcited, leading to hole generation and transport resulting in partial positive charge on the $FeS_2$ nanocrystals. More halide anions are then attracted to the $FeS_2$ surface by the columbic force, leaving behind the cations of the halide ionic liquid, thus creating the separation of charge. This photocharging is due to the photoexcitation of the $FeS_2$ nanocrystals. In the absence of the light, the double layer dissipates and is discharged under the bias voltage. As also further described below, the halide anions of the halide ionic liquid have a strong affinity to the Fe-terminated cations of the surface of the $FeS_2$ nanocrystals, thereby passivating the $FeS_2$ nanocrystals and enhancing electronic coupling and suppressing photodegradation.

The active layer of the PVB devices comprises a porous film of $FeS_2$ nanocrystals. $FeS_2$ nanocrystals having different shapes may be used. For example, the shape may be substantially spherical (such nanocrystals are referred to herein as "nanospheres" or "NS") or the shape may be substantially cubical (such nanocrystals are referred to herein as "nanocubes" or "cubes" or "NC"). The largest dimension of the $FeS_2$ nanocrystals is less than about 1000 nm. The dimension of the $FeS_2$ nanocrystals may refer to the diameter (e.g., for nanospheres) or to the length of a side (e.g., for nanocubes). The dimension may refer to an average dimension, by which it is meant an average value for a population of nanocrystals. Mixtures of $FeS_2$ nanocrystals having different shapes and sizes may be used. Suitable, non-limiting methods for making $FeS_2$ nanocrystals and porous films from the $FeS_2$ nanocrystals are described in the Examples below. Regarding the disclosed methods for making $FeS_2$ nanocrystals, experimental conditions may be adjusted (e.g., reaction time and reaction temperature) to achieve $FeS_2$ nanocrystals having a particular desired shape, dimension and crystallinity. Regarding the disclosed methods for making the porous films of $FeS_2$ nanocrystals, experimental conditions may be adjusted to achieve films have a particular desired characteristic (e.g., thickness, porosity, etc.). For example, the concentration of the $FeS_2$ nanocrystals and the volume ratio of differently shaped/sized nanocrystals in a mixture may be adjusted.

The active layer of the PVB devices further comprises a halide ionic liquid infiltrating the porous film of $FeS_2$ nanocrystals. The halide ionic liquid is composed of halide anions and organic cations. Suitable, non-limiting halide anions include iodide ($I^-$), bromide ($Br^-$), chloride ($Cl^-$), etc. Suitable, non-limiting organic cations include 1-alkyl-3-methylimidazolium. Alkyl groups having different numbers of carbon atoms may be used. Suitable, non-limiting alkyl groups include ethyl, butyl, hexyl, etc. Other suitable halide ionic liquids include cetyltrimethylammonium halide (e.g., bromide), hexadecyltrimethylammonium halide (e.g., chloride), and tetrabutylammonium halide (e.g., iodide).

The PVB devices further comprise a transparent substrate. Suitable, non-limiting transparent substrates include glass coated with a transparent conducting film, e.g., indium tin oxide (ITO). Graphene coated glass or flexible polymeric substrates are also suitable substrates. The PVB devices may further comprise a hole transport layer disposed over the transparent substrate and underlying the active layer. Suitable, non-limiting hole transport layers include poly(3,4-ethylene dioxythiophene):poly(styrene sulfonate) (PEDOT:PSS). The PVB devices further comprise an electrode. A variety of conductive materials, e.g., metals may be used for the electrode. The PVB devices may comprise other layers and components typically used in photovoltaic and battery devices for optimal operation.

The PVB devices may be characterized by certain properties, including power conversion efficiency and specific capacity. The PVB device may be characterized by a power conversion efficiency of at least about 2%, at least about 4%, or at least about 6%. In some embodiments, the power conversion efficiency is in the range of from about 3% to about 4%. The power conversion efficiency can be determined from current-voltage curves measured under AM 1.5 illumination as described in the Examples below. The PVB device may be characterized by a specific capacity of at least about 35 mAhg$^{-1}$, at least about 40 mAhg$^{-1}$, at least about 50 mAhg$^{-1}$, at least about 60 mAhg$^{-1}$, at least about 100 mAhg$^{-1}$, at least about 200 mAhg$^{-1}$ or at least about 300 mAhg$^{-1}$. The specific capacity can be calculated from cyclic voltammogram curves measured at a specific scan rate (e.g., 0.1 V/s) under specific illumination conditions (e.g., under dark) as further described in the Examples below.

An embodiment of a PVB device 100 is illustrated in FIG. 1. The PVB device 100 comprises a transparent substrate 102, a hole transport layer 104 disposed on the transparent substrate, an active layer 106 disposed on the hole transport layer and an electrode 108 disposed on the active layer. The active layer 106 comprises a porous film of FeS$_2$ nanocrystals 110a, 110b and a halide ionic liquid 112 infiltrating the porous film. In this embodiment, the FeS$_2$ nanocrystals comprise a matrix of FeS$_2$ nanospheres 110a and FeS$_2$ nanocubes 110b dispersed throughout the matrix.

The disclosed active layers may be used in the disclosed PVB devices or in photocapacitor devices. In some embodiments, the PVB devices may be referred to as photocapacitors.

In some embodiments, the active layer and/or the PVB device is substantially free of water and/or solvent (e.g., solvents used in the synthesis and handling of the FeS$_2$ nanocrystals such as acetonitrile). In some embodiments, the active layer and/or the PVB device is substantially free of ligands typically used to passivate FeS$_2$ nanocrystals, e.g., octadecylamine, oleic acid, ethanedithiol, aromatic thiols, alkylamines, and mercaptocarboxylic acids, etc. In some embodiments, the active layer and/or the PVB device does not comprise a semiconductor material (e.g., a semiconductor layer or semiconductor nanoparticles) having a majority carrier type (e.g., n-type) opposite that of the FeS$_2$ nanocrystals. In some embodiments, the active layer consists essentially of the porous film of FeS$_2$ nanocrystals and the halide ionic liquid. The active layer may comprise a minor amount of the components used in forming the active layer (e.g., using the methods described in the Examples below) and may still be considered to consist essentially of the porous film of FeS$_2$ nanocrystals and the halide ionic liquid.

In another aspect, a method for making a PVB device is provided which comprises depositing a porous film of FeS$_2$ nanocrystals on a transparent substrate (e.g., via a microcentrifuge method) and infiltrating (e.g., by spin-coating) the porous film with a halide ionic liquid to provide an active layer. The substrate may be a transparent substrate on which a hole transporting layer has been previously deposited. If the as-deposited porous film of FeS$_2$ nanocrystals comprises any ligands or surfactants associated with the FeS$_2$ nanocrystals during the deposition step, the method may comprise removing the ligands and/or surfactants prior to the infiltrating step. The method may further comprise drying the active layer (e.g., via exposure to heat). The method may further comprise depositing an electrode on the active layer.

In another aspect, methods of using the PVB devices are provided. The methods involve exposing any of the disclosed PVB devices to light, wherein photons incident on the active layer are absorbed by the FeS$_2$ nanocrystals, generating a current and a voltage, whereby a separation of charge within the active layer is created, which is discharged in the absence of the light.

The disclosed PVB devices will be understood more readily by reference to the following examples, which are provided by way of illustration and are not intended to be limiting.

EXAMPLES

Materials and Methods

FeS$_2$ Nanocrystal Synthesis:

The FeS$_2$ nanocrystals were prepared using a modified protocol from Puthussery et al., Colloidal Iron Pyrite (FeS$_2$) Nanocrystal Inks for Thin-Film Photovoltaics, *Journal of the American Chemical Society* 2010, 133 (4), 716-719. In detail, in one flask, 4 mmol sulfur solid particles was dissolved in 5 mL diphenyl ether and sonicated until all sulfur was dissolved and then degassed for one hour at 70° C. under argon. In a separate vessel 0.5 mmol of FeCl$_2$ was dissolved in 12 g octadecylamine (ODA) and degassed for 1 hour at 120° C. to allow for decomposition. For FeS$_2$ nanospheres (NS), the iron solution was then raised to 220° C. (for FeS$_2$ cubes the solution was kept at 120° C.) and the sulfur solution was rapidly injected into the iron solution. The solution immediately turned black upon injection. This solution was allowed to react for 90 min. After the reaction was finished, the solution was allowed to cool to ~100° C. and halted with injection of methanol and crashed out using centrifugation. The FeS$_2$ nanocrystals were cleaned up using standard crash out/wash method using chloroform/ethanol by centrifugation in a N$_2$ glovebox. After cleaning the nanocrystals were redispersed in chloroform for storage and characterization.

Materials Characterization:

All UV-Vis-NIR absorbance spectra were obtained on a UV-3600 Shimadzu Spectrophotometer. Room temperature x-ray powder patterns were obtained using monochromated Cu—Kα radiation (λ=1.54178 Å) on a Bruker Proteum Diffraction System equipped with Helios multilayer optics, an APEX II CCD detector and a Bruker MicroStar microfocus rotating anode x-ray source operating at 45 kV and 60 mA. The powders were mixed with a small amount of Paratone N oil to form a paste that was then placed in a small (<0.5 mm.) nylon kryoloop and mounted on a goniometer head. Transmission Electron Microscope (TEM) images were obtained using Field Emission FEI Tecnai F20 XT.

Field Emission Scanning Electron Microscope (FESEM) images were obtained using LEO 1550 FESEM.

PVB Device Fabrication and Measurement:

The Schottky photovoltaic-battery devices are fabricated as follows: The $FeS_2$ NS and cubes were dissolved in chloroform with concentration of 25 mg/mL and 40 mg/mL, respectively. The mixture of $FeS_2$ NS (25 mg/mL) and cubes (40 mg/mL) was prepared with a volume ratio 2:1. The poly(3,4-ethylene dioxythiophene):poly(styrene sulfonate) (PEDOT:PSS) hole transport layer was spun-coated on the indium tin oxide (ITO) substrate at 3000 RPM for 1 min. The $FeS_2$ NS, $FeS_2$ cubes and mixture were deposited on the ITO surface by the micro-centrifuge method at the speed of 1500 RPM for 1 min. The $FeS_2$ nanocrystals were originally capped with octadecylamine (ODA) surfactants, which were removed through an ethanedithiol (EDT) treatment in acetonitrile solvent.

For the BMII-treated $FeS_2$ device, 20 μL of 1-butyl-3-methylimidazolium iodide (BMII) was dropped onto the $FeS_2$ nanocrystal surface, then spin coated at 3000 RPM for 1 min and dried on a hot plate at 100° C. for 1 min. The process was similar for the [HMIM][Br]-treated $FeS_2$ device using 1-hexyl-3-methylimidazolium bromide (HMIM). This process allows the ionic liquid (IL) to seep into the porous $FeS_2$ active layer and achieves passivation of the nanocrystals by replacing long organic ligands with halide anions bonded to cations. The infiltration of solution-cast materials into mesoporous structures has been investigated. If the concentration of the solution is low enough, and the solubility of the cast materials is high enough, the materials will penetrate the pores as the solvent evaporates. Typically, the materials form a "wetting" layer upon the internal surface of the mesoporous film that uniformly coats the pore walls throughout the whole thickness of the active layer. The degree of "pore-filing" can be controlled by varying the solution concentration. If the concentration of the casting solution is high, then maximum pore filing occurs and any "excess" materials form a "capping layer" on top of the filled mesoporous film surface. Since ILs do not evaporate quickly, there is good infiltration of the IL into the pores of the active layer.

Finally, a patterned aluminum electrode (~80 nm) was evaporated on the top surface to complete the device. Current-Voltage (I-V) data were measured using a Keithley 2400 source-meter. The solar spectrum at AM 1.5 was simulated to within class A specifications (less than 25% spectral mismatch) using a Xenon lamp and filter (Solar Light, Inc.) and intensity was adjusted to 100 mW/cm$^2$.

Results

The mineral iron pyrite (fool's gold) is an iron disulfide with the formula $FeS_2$. Pyrite's crystal structure is simple cubic much like NaCl and can be thought of as iron atoms occupying the sodium position and $S_2^{-2}$ dumbells in place of the chlorine ion, which renders the Fe-dominant {100} surface. The Fe-terminated {100} surface facet dominant colloidal growth has been shown to result in the cubic structures. X-ray diffraction (XRD) patterns of the as-synthesized $FeS_2$ nanocrystals were obtained and were consistent with the pyrite structure (JCPDS Card No 1-079-0617), indicating that the nanocrystals are single-phase pyrite without detectable marcasite, greigite, pyrrhotite, or other impurities. The XRD results show that after passivation, the $FeS_2$ nanocrystals maintain their crystalline state. Absorption spectra of $FeS_2$ nanocrystals (nanosphere: NS, nanocube: cube, and their mixture) were obtained which demonstrated promising light harvesting capabilities across the visible to near-infrared (NIR) spectrum.

Figure 2B:
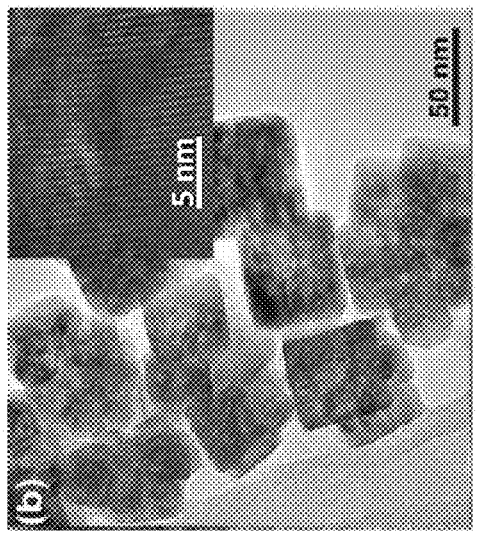
FIGS. 2A-C shows transmission electron microscope (TEM) images of $FeS_2$ nanospheres (A), $FeS_2$ nanocubes (B) and a mixture of $FeS_2$ nanospheres and nanocubes (C).
Figure 2C:
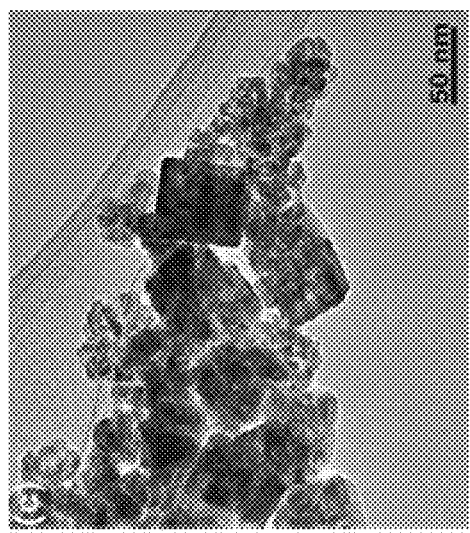
Figure 2A:
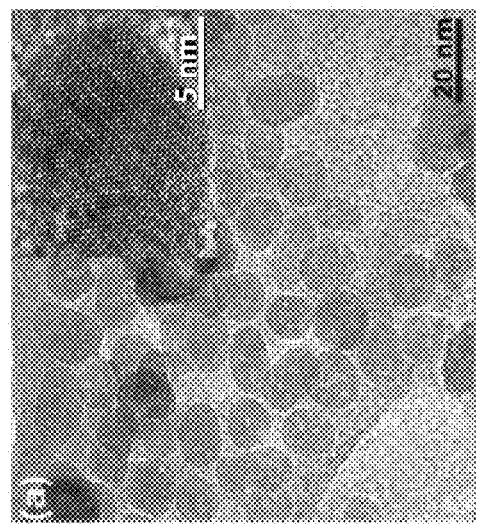

In this Example, three different ligands were utilized to examine their passivation effects on the performance of the PVB devices. The EDT ligand was examined as a reference to compare with the halide based ionic liquid (IL) passivation effects. The two halide based ILs include 1-hexyl-3-methylimidazolium bromide ([HMIM][Br]) and 1-butyl-3-methylimidazolium iodide (BMII). After the halide atomic ligand exchange, transmission electron microscopy (TEM) images were obtained, which were used to investigate the stability of $FeS_2$ nanocrystals without noticeable shape change. FIGS. 2A-C show the transmission electron microscopy (TEM) images of well dispersed $FeS_2$ NS, cubes and mixture, respectively. The $FeS_2$ NS and cubes exhibited average 13.4 nm diameter and a 47.5 nm side length, respectively. High resolution TEM (HRTEM) images (inset of FIGS. 2A and 2B) show the lattice fringe of $FeS_2$ nanocrystals with the lattice spacing of 0.27 nm, matching the (200) plane of pyrite. Scanning TEM-EDS mapping images were obtained which show the elemental mapping of the iodide passivated $FeS_2$ nanocrystals which are embedded into the iodide ligand matrix. FIG. 1 shows a schematic of the integrated $FeS_2$ PVB along with a cross-section SEM image of the device for comparison. It can be seen that the $FeS_2$ NS also form a matrix around the $FeS_2$ cubes, which produces a bulk-heterojunction structure which is backfilled by the spun-cast halide based IL to allow for efficient charge transfer and transport. A 3D atomic force microscope (AFM) cross-section image of the $FeS_2$ NS-cube mixture PVB device was obtained, which further confirmed the well-distributed $FeS_2$ nanocrystals stacked between two electrodes to form the PVB device.

Fourier transform infrared spectroscopy (FTIR) was used to confirm that the halide atomic ligand treatment of $FeS_2$ nanocrystals enables the removal of surface insulating organic ligands. The FTIR spectra show the complete removal of the octadecylamine ligands (—$CH_3$ vibrations at 2874 cm$^{-1}$ and 2959 cm$^{-1}$, —$CH_2$ vibration 1462 cm$^{-1}$ and 2935 cm$^{-1}$, and —$NH_2$ vibration 3082 cm$^{-1}$ and 3144 cm$^{-1}$).

Figure 3:
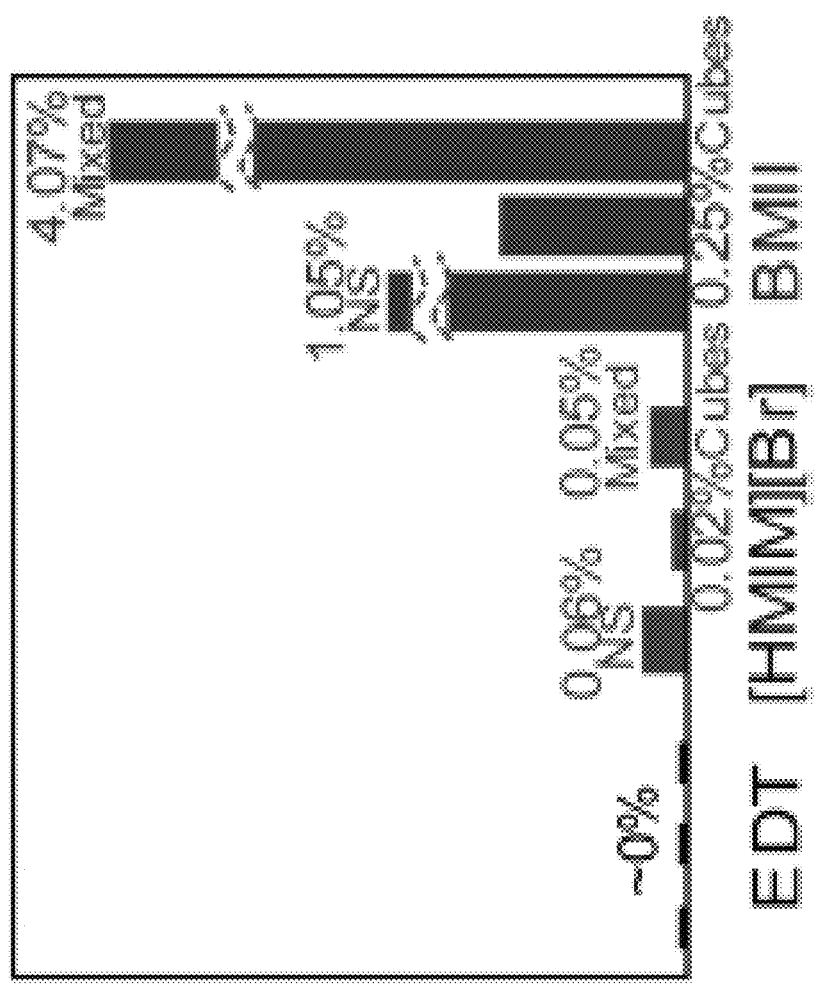
FIG. 3 shows the power conversion efficiencies of $FeS_2$ PVB devices modified with ethanedithiol (EDT), 1-butyl-3-methylimidazolium bromide (BMII) and 1-hexyl-3-methylimidazolium bromide ([HMIM][Br]).

The ability of surface passivated $FeS_2$ nanocrystals to facilitate the extraction of photocurrent and photovoltage of PVB devices was investigated. FIG. 3 summarizes the power conversion efficiencies among the $FeS_2$ NS, cube, and mixture based devices using different ligands (EDT, [HMIM][Br] and BMII). There is no photovoltaic performance of the EDT-treated PV devices (i.e., the power conversion efficiencies of these devices are about 0%). Using [HMIM][Br], the $FeS_2$ PVs achieve a photoresponse and a low photovoltaic performance. In particular, current-voltage (J-V) curves measured under simulated AM 1.5 100 mW/cm$^2$ illumination were obtained. The $FeS_2$ NS device exhibited a short-circuit photocurrent ($J_{sc}$) of 0.175 mA/cm$^2$, $V_{oc}$ of 0.54 V with a fill factor of 0.67 yielding an overall power conversion efficiency (η) of 0.06%. When $FeS_2$ cubes were used, the device exhibited a lower circuit photocurrent ($J_{sc}$) of 0.08 mA/cm$^2$, a higher $V_{oc}$ of 0.59 V with a fill factor of 0.52 yielding an overall power conversion efficiency (η) of 0.02%. The ITO/$FeS_2$ NS-cubes mixed/Al device exhibited a short-circuit photocurrent ($J_{sc}$) of 0.17 mA/cm$^2$, a $V_{oc}$ of 0.53 V with a fill factor of 0.58 yielding an overall power conversion efficiency (η) of 0.05%.

Figure 4:
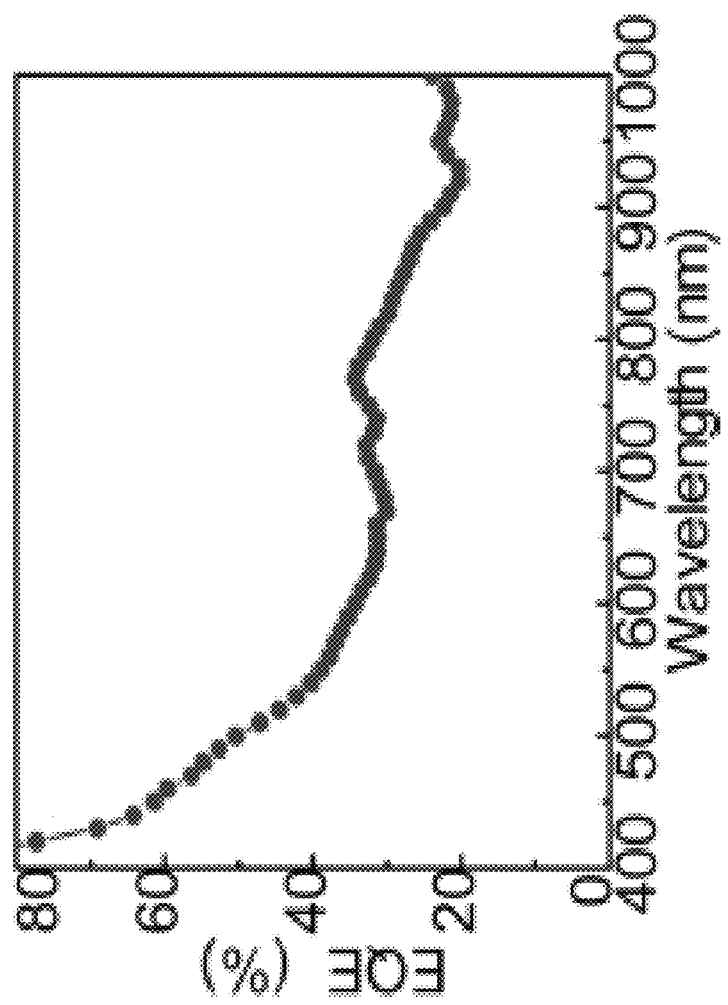
FIG. 4 shows the external quantum efficiency (EQE) spectrum of a BMII-treated $FeS_2$ NS/cube mixture PVB device.

To investigate a more electro-negative halide atomic ligand effect, the iodide based BMII was used to passivate the $FeS_2$ NS/cube mixture which achieved an efficiency of 4.07% under AM 1.5 illumination. Current-voltage (J-V) curves of BMII-treated $FeS_2$ devices measured under AM 1.5 (100 mW/cm$^2$) illumination were obtained, showing that the FeS$_2$ NS device resulted in an average short-circuit current (J$_{sc}$) of 4.71 mA/cm$^2$, V$_{oc}$ of 0.39 V and a fill factor of 0.57, yielding an overall power conversion efficiency ($\eta$) of 1.05%. The FeS$_2$ cube only device resulted in an average J$_{sc}$ of 1.28 mA/cm$^2$, V$_{oc}$ of 0.59 V and a fill factor of 0.34, yielding an overall efficiency $\eta$ of 0.25%. The most efficient device was the FeS$_2$ NS-cube mixture which exhibited an average J$_{sc}$ of 13.73 mA/cm$^2$, V$_{oc}$ of 0.51 V and a fill factor of 0.59, yielding the maximum average efficiency $\eta$ of 4.07%. These results confirm the benefits of creating a bulk-heterojunction active layer with the FeS$_2$ NS and cube mixture passivated by the iodide atomic ligands. The intimate contact between the FeS$_2$ NS matrix and cube component addresses the voids created by cube-only device, and also reduces the interfacial area of a NS-only device. FIG. 4 shows the external quantum efficiency (EQE) spectrum of the BMII-treated FeS$_2$ NS/cube mixture device which exhibits spectral sensitivity spanning from the visible to the NIR (400-1000 nm), matching very well with the UV-vis-NIR absorbance spectrum. The EQE shows maximum 80% photon-to-electron conversion in the blue spectral region, and a theoretical photocurrent density of 13.13 mA/cm$^2$ is achieved by integrating the visible and NIR wavelength EQE spectrum.

It is known that FeS$_2$ materials have relatively scattered electric properties due to the formation of surface defects related to sulfur vacancies and oxygen absorbance. These problems could be exacerbated in the nanocrystal devices due to the high concentration of interfaces. An investigation of the effect of halide atomic ligand passivation on charge carrier dynamics, lifetime and related carrier density due was undertaken. An optical ultrafast pump-probe technique was used to measure the carrier lifetime. A pump laser pulse of 100 fs and 750 nm injected charge carries by exciting electrons from the valence band to the conduction band. These carriers were probed by a time-delay probe pulse of 100 fs and 810 nm Reflection of the probe was collected and sent to a photodiode, which output was measured by a lock-in amplifier. By modulating the intensity of the pump beam with a mechanical chopper, the differential reflection could be measured, defined as $\Delta R/R_o = (R-R_o)/R_o$, where R and R$_o$ are the reflections with and without the presence of the pump, respectively.

Figure 5:
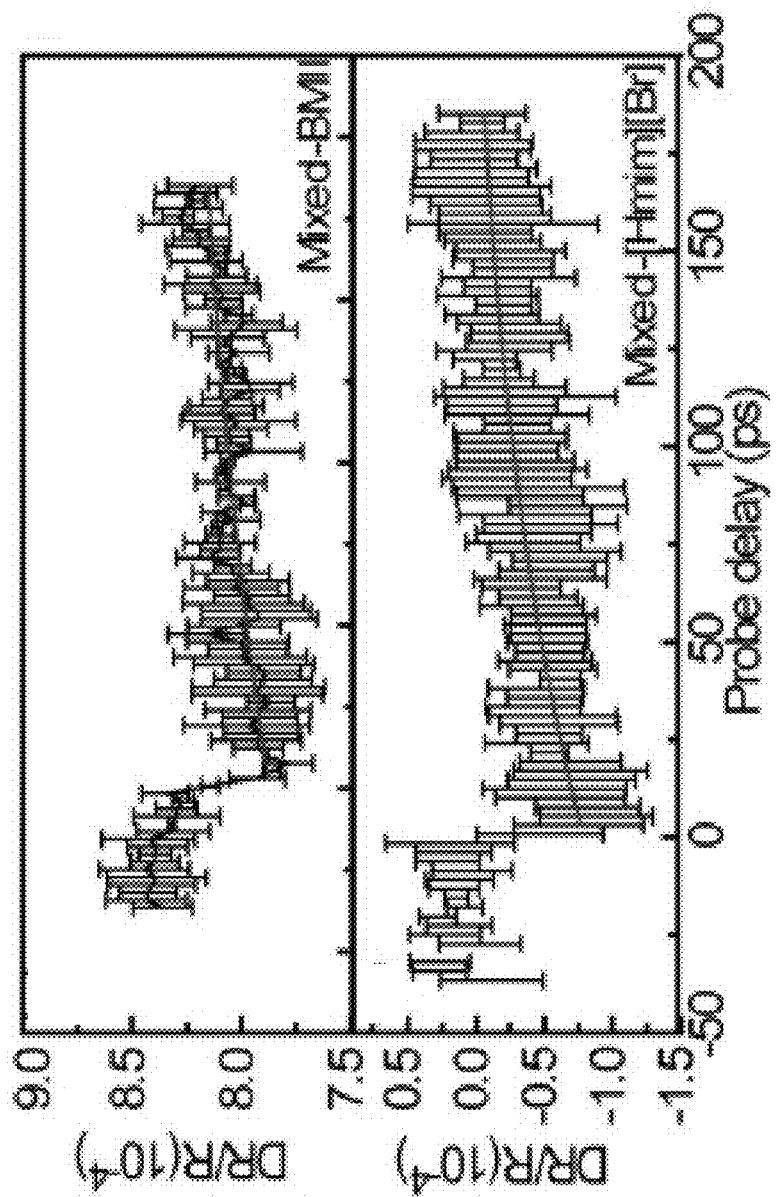
FIG. 5 shows the differential reflection results measured from a BMII-treated $FeS_2$ NS/cube mixture PVB device (top) and a [HMIM][Br]-treated $FeS_2$ NS/cube mixture PVB device (bottom).
Figure 6:
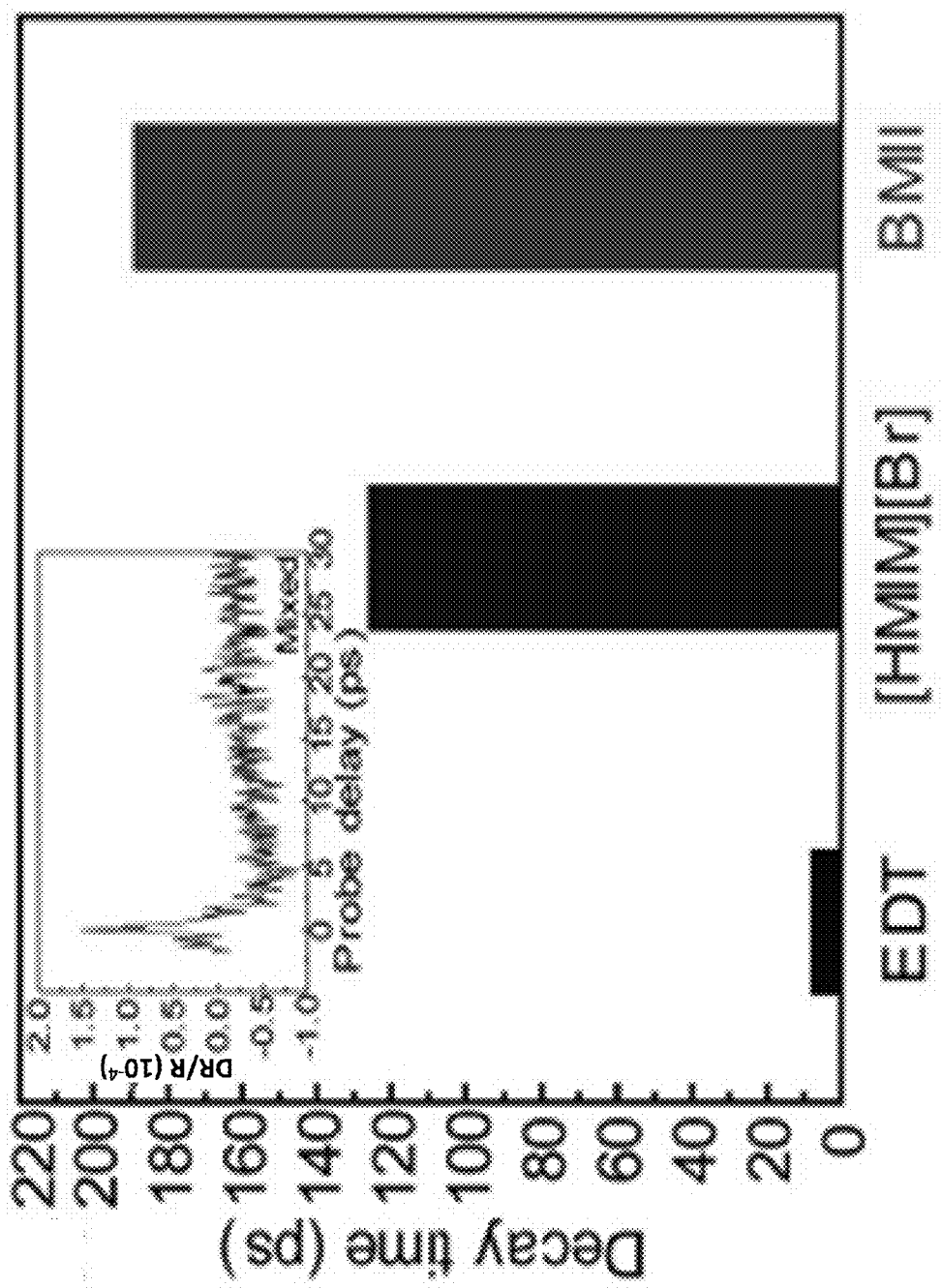
FIG. 6 shows the measured decay times for $FeS_2$ NS/cube mixture PVB devices treated with either EDT, [HMIM][Br] or BMII. The inset shows the differential reflection results for the EDT-treated device.

FIG. 5 shows the measured reflection signal as a function of the probe delay (the arriving time of the probe pulse at the sample with respect to the pump pulse), corresponding to FeS$_2$ NS/cube mixture PVB devices treated with BMII or [HMIM][Br]. The measured decay time can be attributed to the carrier lifetime of FeS$_2$ nanocrystals. The signal decays exponentially, so by fitting the curve, the carrier lifetime of the passivated FeS$_2$ nanocrystals can be obtained. As summarized in FIG. 6, the EDT, [HMIM][Br] and [BMII] treated PVB devices exhibit a carrier lifetime of 8 ps, 126 ps and 189 ps, respectively. The ultrashort lifetime of the EDT-treated PVB device is consistent with the low efficiency measured. The halide ligand-passivated devices have longer carrier lifetimes and the higher efficiency may be attributed to the passivation of FeS$_2$ surface defect states and fast carrier transport.

Figure 7A:
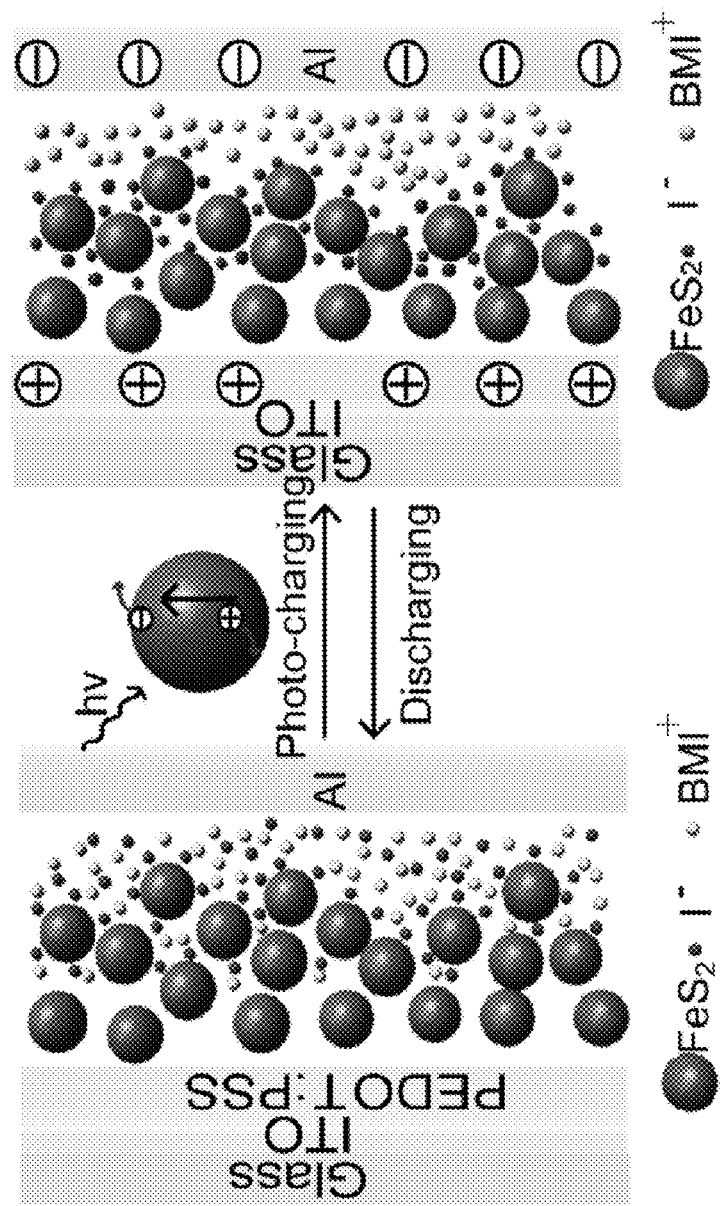
FIG. 7A shows a schematic of the mechanism of a PVB device and FIG. 7B shows a schematic of the energy band diagram of the device.
Figure 7B:
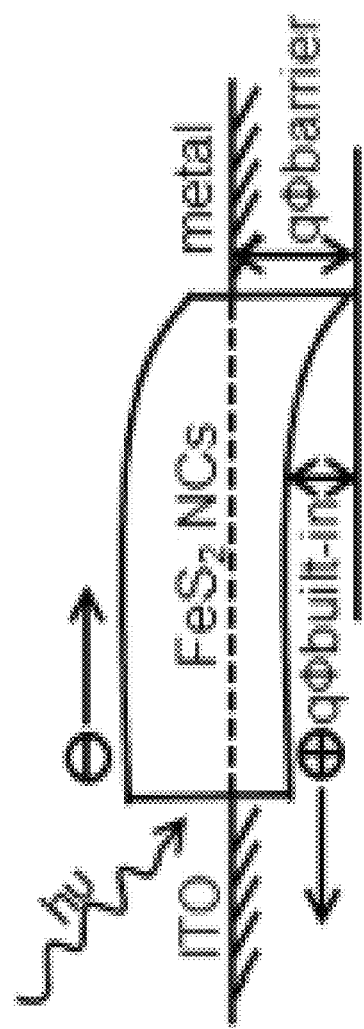

The mechanism of the hybrid PVB device is illustrated in FIGS. 7A-B. Under dark, the power generation process is based on the FeS$_2$ battery discharging process. The IL-only device without FeS$_2$ nanocrystals does not exhibit an ability to generate power, which confirms the contribution of the FeS$_2$ nanocrystals. The potential difference or voltage of battery under dark is interpreted using the capacitor model. The iodide (I$^-$) anions are physically adsorbed onto the Fe-rich surface of the nanocrystal facets by electrostatic adsorption, and the redox process occurs on the cathode side to accumulate electrons. The BMI$^+$ cations of the IL move to the other direction toward the PEDOT:PSS/ITO anode side. The accumulated charges at two electrodes can provide a potential difference to drive the flow of electrons through an external load. The separated charges on the opposite electrodes accelerate the charge transport process. In the illuminated state, there are two processes present in this device. The main scheme is similar to the traditional Schottky PV device, where the passivated FeS$_2$ nanocrystals absorb photons and produce photocurrent and photovoltage, which dominates the PV performance. As shown in FIG. 7B, in the Schottky PV device, band bending occurs at the junction between the FeS$_2$ and Al electrode, causing photoelectrons generated in the FeS$_2$ to be injected into the Al electrode. The other process observed is the charging process of the pyrite battery. The charging process includes the redox mediator regeneration (I$^-$) from the photoexcited electrons of FeS$_2$ under illumination.

Figure 8:
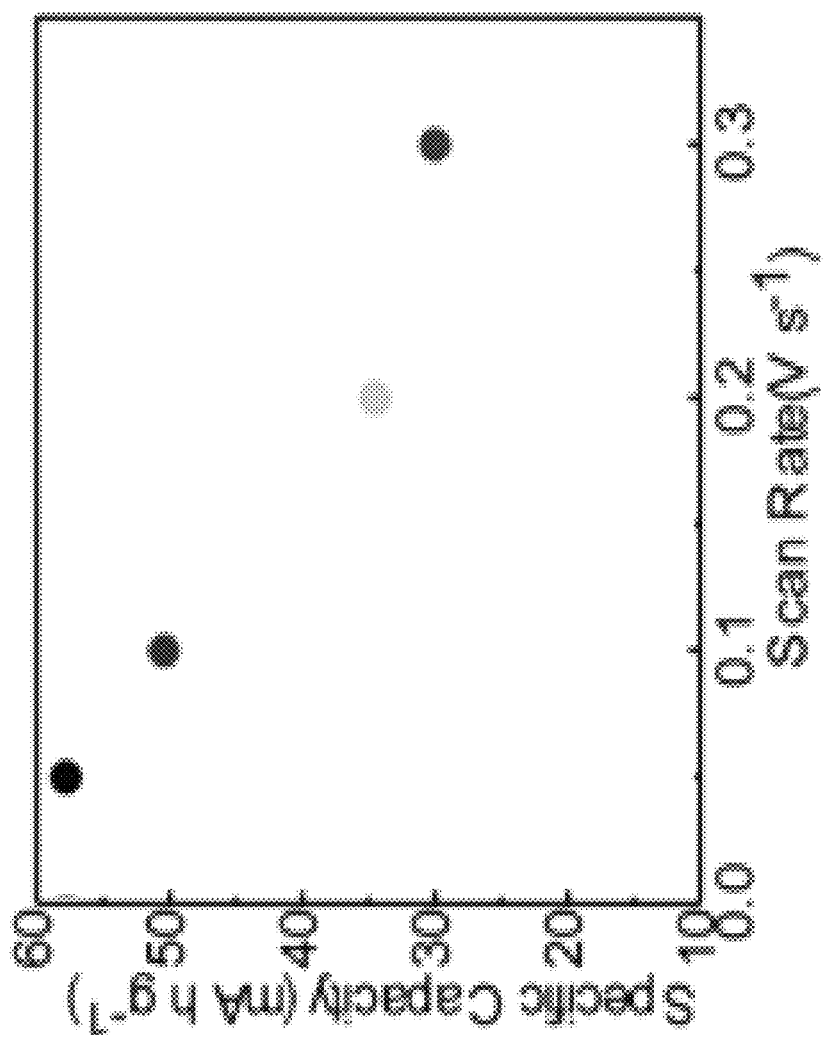
FIG. 8 shows the average specific capacitance values as a function of scan rate for a BMII-treated $FeS_2$ NS/cube mixture PVB device.
Figure 9:
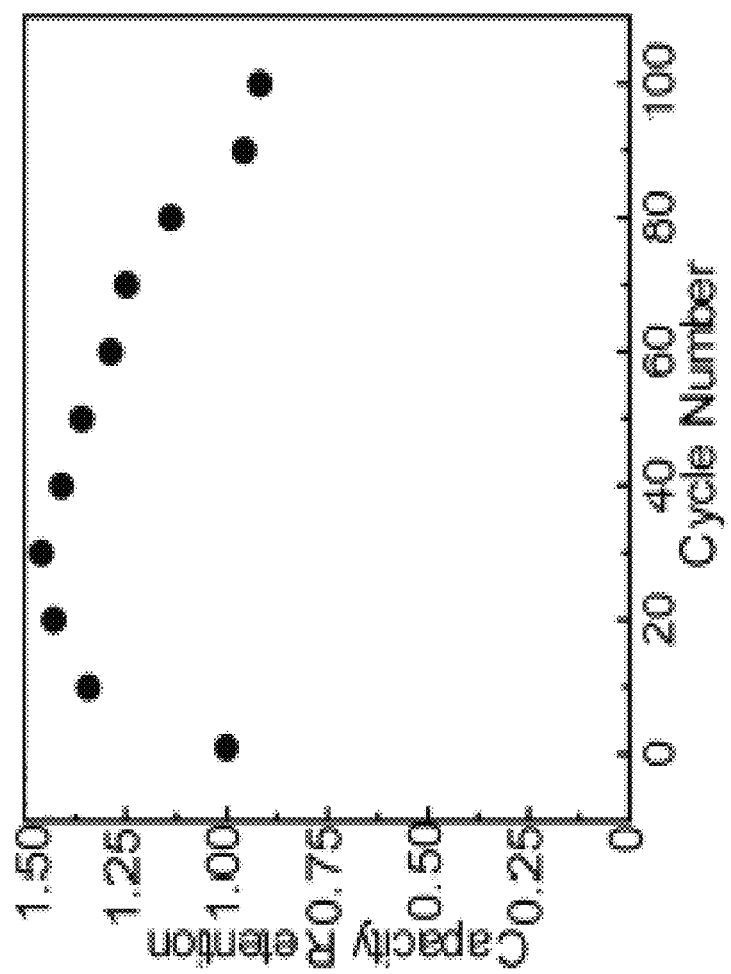
FIG. 9 shows the capacity recycle measurement for a BMII-treated $FeS_2$ NS/cube mixture PVB device.

Subsequently the electrons were injected into Al cathode to complete the circuit. Cyclic voltammogram (CV) curves of BMII-treated FeS$_2$ NS-cube mixture PVB devices were obtained. The specific capacity (C$_s$) was calculated from the CV loops using Cs=∫i/m dt, where i is the oxidation or reduction current, dt is the time differential, and m is the mass of the active electrode materials. As shown in FIG. 8, the BMII-treated FeS$_2$ NS/cubes mixture PVB device showed a specific capacity of 57.8 mAhg$^{-1}$ and 30.0 mAhg$^{-1}$ (based on the mass of FeS$_2$) at a scan rate of 50 mVs$^{-1}$ and 300 mVs$^{-1}$ (corresponding to 10 s of a full charging or discharging period), respectively, suggesting excellent rate capability of the FeS$_2$ material. As shown in FIG. 9, the capacity recycle measurement shows FeS$_2$ PVB device stability even after 100 cycles, which is different from a traditional Li-ion FeS$_2$ battery.

Figure 10:
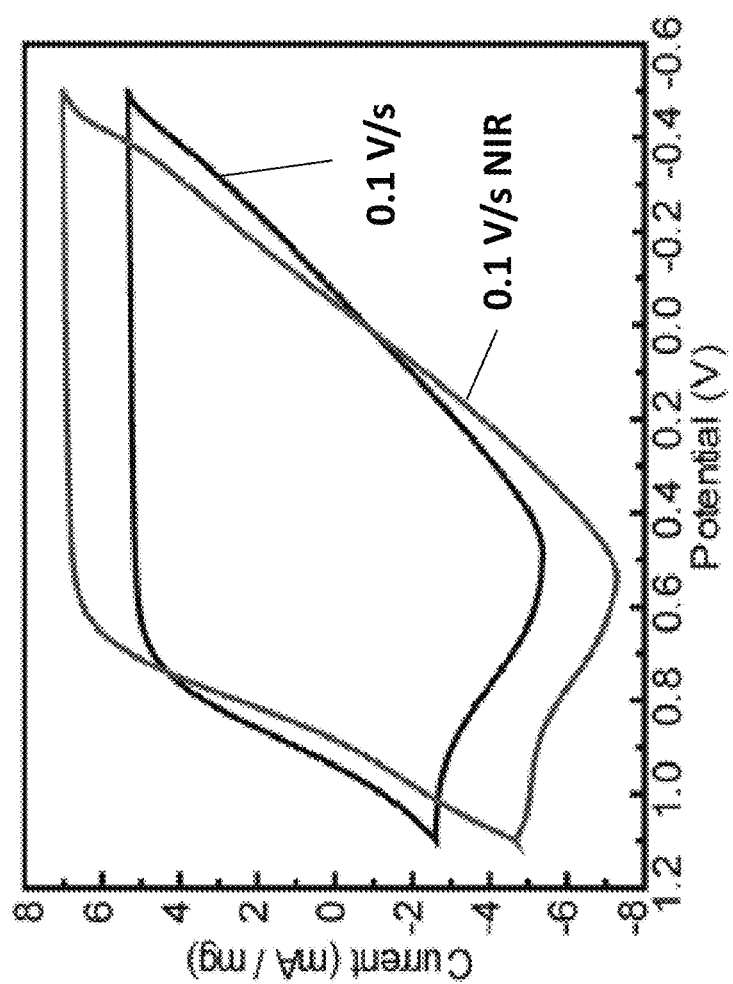
FIG. 10 shows the cyclic voltammetry curves of $FeS_2$NS/cube mixture PVB device at scan rates of 0.1V/s, under room ambient light (as "dark") and 1100 nm NIR illumination (as "light").

FIG. 10 shows the cyclic voltammetry curves of FeS$_2$NS/cube mixture PVB device at scan rates of 0.1V/s, under room ambient light (as "dark") and 1100 nm NIR illumination (as "light"). The I-V curves of ITO/PEDOT/BMII/Al device (no FeS$_2$ nanocrystals) were obtained under dark and AM-1.5 illumination. Both of the curves went through the (0,0) point, indicating that the ionic liquid BMII alone could not produce potential difference between the two electrodes and provide power for the external load.

In summary, the solution processed FeS$_2$ nanocrystal schottky photovoltaic-battery device has been demonstrated as non-interrupted power source. The FeS$_2$ nanocrystal PVB devices exhibit 4.07% power conversion efficiency under AM 1.5 illumination and 57.8 mAhg$^{-1}$ specific capacity under dark. The halide atomic ligand passivation strategy from the ionic liquids enables high carrier mobility and excellent device stability, whilst using low cost chemicals readily available and easily processed. The iodide based ligand passivation of FeS$_2$ nanocrystals shows 20 times increase of carrier lifetime, in comparison with the EDT ligand exchange process.

Additional Results

Figure 11:
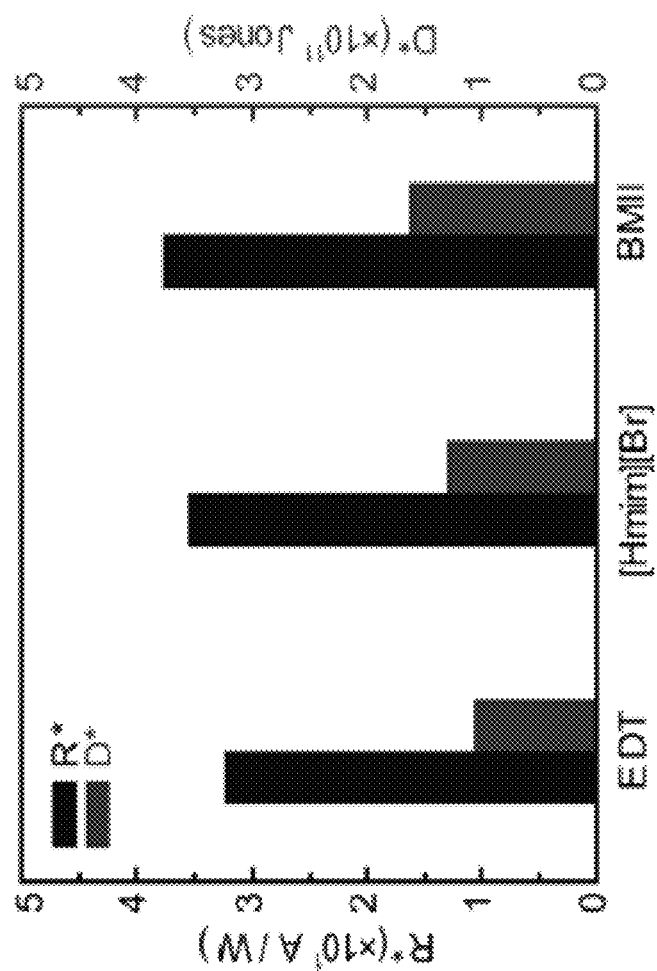
FIG. 11 shows the photoresponsivity (left boxes and left axis) and detectivity (right boxes and right axis) of $FeS_2$ NS/cube mixture PVB devices treated with either EDT, [HMIM][Br] or BMII.

PVB devices were illuminated using 1100 nm near-infrared (NIR) light. The NIR light source used here could be used to photoexcite FeS$_2$ only. As shown in FIG. 11, the high performance BMII-passivated FeS$_2$ PVB devices exhibited a photoresponse of 37.6 A/W (left box and left axis) and photodetectivity of 1.6×10$^{11}$ (right box and right axis) under 1100 nm illumination. With the aim of testing FeS$_2$ photocharging ability, electrochemical capacitance measurements under 1100 nm NIR light and cyclic voltammogram measurements of BMII-passivated FeS$_2$ PVB devices were obtained at a scan rate of 0.1 V/s. A specific capacity ($C_s$) of 37.5 mA·h/g under room ambient light (as "dark") and 46.0 mA·h/g under the 1100 nm NIR illumination (as "light") were obtained. The specific capacity increases by 23% under the NIR light illumination, which confirms the photocharging from NIR photoresponsive FeS$_2$ nanocrystals. The FeS$_2$ PVB devices were also tested under different scan rates (0.2, 0.3, 0.4 and 0.5 V/s). The CV curves remained similar in shape for the different scan rates indicating a high electrochemical stability and capacitance.

The photocurrent of EDT modified FeS$_2$ NS, cube, and mixture devices was measured. Cube-only pyrite active material exhibited the lowest photocurrent. When replacing cubes with NS, the photocurrent increases significantly. By mixing the FeS$_2$ NS and cube together, the photocurrent reaches its maximum. Thus, cubes are more active than the quantum dots, but benefit from a matrix surrounding them to help with charge transport due to their large size and poor stacking in films. Knowing that the mixture of both shapes gives the best performance, different ILs were tested to compare the effect of different halide ions on the photocurrent generation. A higher photocurrent is observed by using the [Hmim][Br] as compared to EDT based passivation. When replacing the Br$^-$ ion with the I$^-$ ion in the BMII ionic liquid, the current again takes an even more substantial enhancement. The increase in the photocurrent could be related to the passivation of the pyrite surface defects, where the I$^-$ ions show better effective passivation than that of Br$^-$.

Figures 12A, 12B:
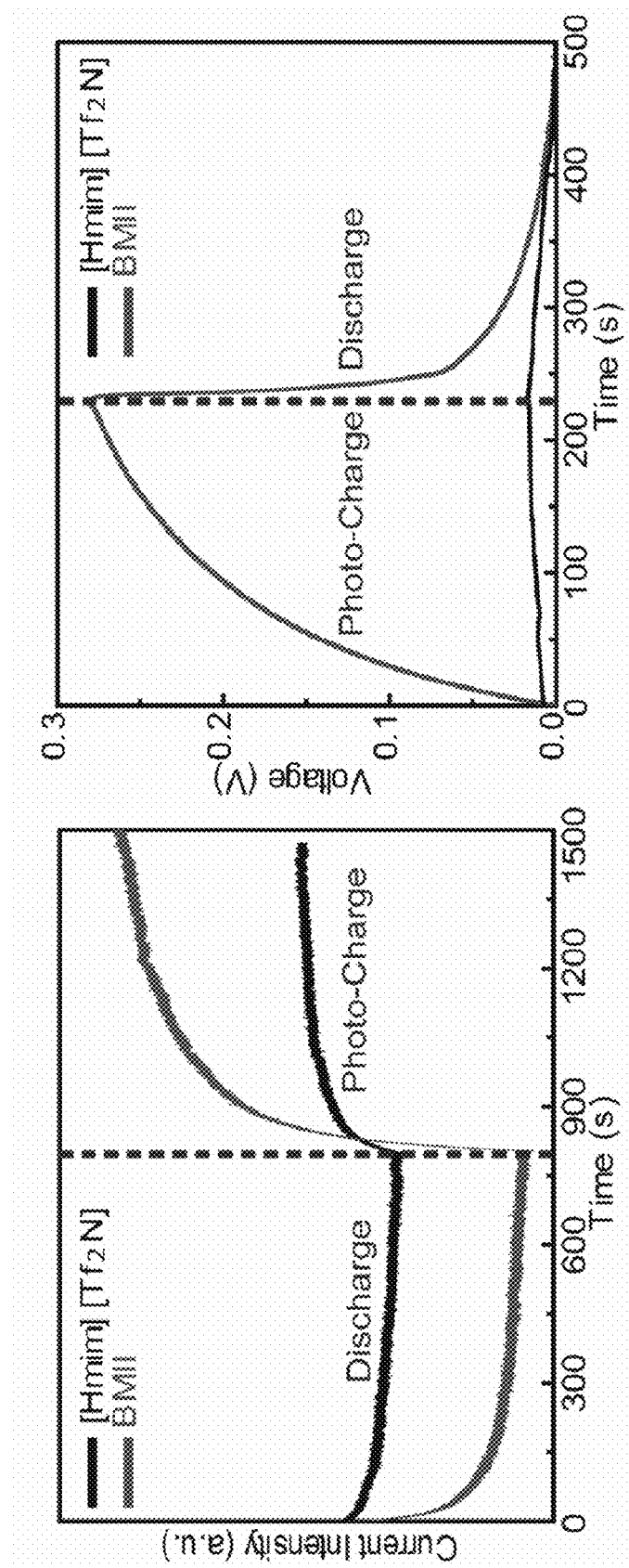
FIG. 12A shows the current-time (I-t) characteristics of a $FeS_2$ photocapacitor (PVB device) modified with [BMII] (bottom curve in left portion of figure and upper curve in right portion of figure) and [Hmim][Tf$_2$N] (upper curve in left portion of figure and lower curve in right portion of figure).
FIG. 12B shows the charge-discharge V-t characteristics of $FeS_2$ photocapacitor (PVB device), modified by BMII (upper curve) and [Hmim][Tf$_2$N] (lower curve).

To understand the size effect of different ions on the transport properties of FeS$_2$ photocapacitors, an ionic liquid with a bigger anion ([Tf$_2$N]$^-$) was selected. As shown in FIGS. 12A-B, the current-time and the voltage-time characteristics of the FeS$_2$ photocapacitor modified with [BMII] and [Hmim][Tf$_2$N] were obtained. The rate of discharging is seen to change between the two electrolytes, where I$^-$ charges faster than the bigger [Tf$_2$N] due to mobility's proportionality to the radius of ions ($v \approx 1/r^2$). When the small sized I$^-$ is used, it can passivate FeS$_2$ nanocrystals more effectively and move faster, which allows it to exhibit higher capacity and fast discharging rate. The photon-induced energy stored in the capacitor can be calculated by integrating I-t curves (current intensity reaches to the saturation under AM-1.5 light illumination). According to $W_{stored}=QU=U\int\int dtdt$, where $W_{stored}$, Q, U, i and t are storage energy, electric quantity, applied voltage, current and time, the photocharged energy density was calculated as $1.13 \times 10^4$ J/g for the BMII-based PVB device and $0.3 \times 10^4$ J/g for the [Hmim][Tf$_2$N]-based PVB device. The former is nearly 4 times than that of the latter case, which further confirms the ionic size effect on the transport and capacitance of the PVB devices. This can be partially attributed to the steric effect of the larger size of the [Tf$_2$N] ions, reducing the energy density from the electric double layer capacitors.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like includes the number recited and refers to ranges which can be subsequently broken down into subranges as discussed above. Finally, as will be understood by one skilled in the art, a range includes each individual member.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A photovoltaic battery device comprising:
    a transparent substrate;
    an active layer disposed over the transparent substrate, the active layer comprising a porous film of FeS$_2$ nanocrystals and a halide ionic liquid infiltrating the porous film; and
    an electrode disposed over the active layer, wherein the device is configured such that under exposure to sunlight, photons incident on the active layer are absorbed by the FeS$_2$ nanocrystals, generating a current and a voltage, whereby a separation of charge within the halide ionic liquid of the active layer is created, which is discharged in the absence of the sunlight.

2. The device of claim 1, wherein the FeS$_2$ nanocrystals comprise FeS$_2$ nanospheres, FeS$_2$ nanocubes, or combinations thereof.

3. The device of claim 1, wherein the FeS$_2$ nanocrystals comprise a matrix of FeS$_2$ nanospheres and FeS$_2$ nanocubes dispersed throughout the matrix.

4. The device of claim 1, wherein the halide ionic liquid is a 1-alkyl-methylimidazolium halide.

5. The device of claim 4, wherein the alkyl group is butyl or hexyl and the halide is iodide or bromide.

6. The device of claim 1 characterized by a power conversion efficiency of at least about 4% under AM 1.5 illumination and a specific capacity of at least about 35 mAhg$^{-1}$ in the dark.

7. The device of claim 1, wherein the active layer is substantially free of water and/or solvent.

8. The device of claim 1, wherein the active layer is substantially free of octadecylamine, oleic acid, ethanedithiol, an aromatic thiol, an alkylamine, and/or a mercaptocarboxylic acid.

9. The device of claim 1, wherein the device does not comprise a semiconductor material having a majority carrier type opposite that of the FeS$_2$ nanocrystals.

10. A photovoltaic battery device comprising:
    a transparent substrate;

an active layer disposed over the transparent substrate, the active layer comprising a porous film of FeS$_2$ nanocrystals and a halide ionic liquid infiltrating the porous film; and an electrode disposed over the active layer, wherein the device is configured such that under exposure to sunlight, photons incident on the active layer are absorbed by the FeS$_2$ nanocrystals, generating a current and a voltage, whereby a separation of charge within the active layer is created, which is discharged in the absence of the sunlight, wherein the active layer consists essentially of the porous film of FeS$_2$ nanocrystals and the halide ionic liquid.

11. A photovoltaic battery device comprising:

a transparent substrate;

a hole transport layer disposed on the transparent substrate;

an active layer disposed on the hole transport layer, the active layer comprising a porous film of FeS$_2$ nanospheres, FeS$_2$ nanocubes, or combinations thereof, and a 1-alkyl-methylimidazolium halide ionic liquid infiltrating the porous film; and an electrode disposed on the active layer, wherein the device is configured such that under exposure to sunlight, photons incident on the active layer are absorbed by the FeS$_2$ nanospheres, FeS$_2$ nanocubes, or combinations thereof, generating a current and a voltage, whereby a separation of charge within the halide ionic liquid of the active layer is created, which is discharged in the absence of the sunlight.

12. The device of claim 11, wherein the FeS$_2$ nanocrystals comprise a matrix of FeS$_2$ nanospheres and FeS$_2$ nanocubes dispersed throughout the matrix.

13. The device of claim 11, wherein the alkyl group is butyl or hexyl and the halide is iodide or bromide.

14. A method of using a photovoltaic battery device, the method comprising exposing the device to sunlight, the device comprising:

a transparent substrate;

an active layer disposed over the transparent substrate, the active layer comprising a porous film of FeS$_2$ nanocrystals and a halide ionic liquid infiltrating the porous film; and an electrode disposed over the active layer, wherein photons incident on the active layer are absorbed by the FeS$_2$ nanocrystals, generating a current and a voltage, whereby a separation of charge within the halide ionic liquid of the active layer is created, which is discharged in the absence of the sunlight.

15. The method of claim 14, wherein the device further comprises a hole transport layer disposed on the transparent substrate, the active layer is disposed on the hole transport layer and the electrode is disposed on the active layer, and further wherein the FeS$_2$ nanocrystals comprise FeS$_2$ nanospheres, FeS$_2$ nanocubes, or combinations thereof, and the halide ionic liquid is a 1-alkyl-methylimidazolium halide.

\* \* \* \* \*